Dec. 12, 1950 G. W. HART 2,533,670
ELECTRONIC RANGE FINDING APPARATUS
Filed Jan. 8, 1948

Inventor
GEOFFREY WALTER HART
By J. O. Ollier
Attorney

Patented Dec. 12, 1950

2,533,670

UNITED STATES PATENT OFFICE 2,533,670

ELECTRONIC RANGE FINDING APPARATUS

Geoffrey Walter Hart, Stoke Poges, England, assignor to Electric & Musical Industries Limited, Hayes, Middlesex, England, a company of Great Britain Application January 8, 1948, Serial No. 1,101
In Great Britain January 9, 1947

7 Claims. (Cl. 315—22)

This invention relates to improvements in electronic range finding apparatus such as is used for the purpose of determining the range and bearing of objects, for example ships or aircraft, and in which the range and bearing of an object are represented by an indication on the screen of a cathode ray tube in the ship, aircraft or other observing station. For this purpose the beam of the cathode ray tube is caused to execute radial deflections, the trace produced by said radial deflections being caused to move angularly about the axis of the tube and continuously sweep the screen thereof. The apparatus also comprises an angularly movable aerial system the movements of which are synchronised with the angular movement of the beam, and radio signals, for example reflected pulses, received from an object during the rotation of the aerial system are caused to modulate the beam of the cathode ray tube so that a dark or bright spot forming said indication appears on the screen of the tube, the distance of the spot from the inner end of the radial trace being a measure of the distance of the object from the observing station and the angular displacement of the spot from a predetermined ordinate representing the bearing of the object relative to the observing station.

It will be appreciated that it is essential that the operator should be able to measure quickly and accurately the angular and radial co-ordinates of the spot. Various proposals have been made for facilitating measurement of the radial co-ordinate, none of which however, has proved very satisfactory. For instance, it has been proposed to provide cursors external to the tube, but these require to be illuminated and also to be very carefully adjusted by the operator and moreover they take no account of inaccuracies introduced by non-linear distortion of the beam deflecting field. Another proposal has been to apply pulses to the cathode ray tube so as to modulate the beam to produce a bright spot at a fixed distance from the inner end of the trace so that during rotation of the trace a calibration ring is produced on the screen of the tube which represents a predetermined range. In order that the range of an object represented by an indication on the screen may be accurately determined, it is desirable to arrange for the production of a very large number of such calibration rings, but if a large number of rings are provided the operator finds difficulty in counting them and there is a further serious disadvantage in that a large part of the screen is occupied by the rings, and indications representing objects may be obscured.

The object of the invention is to provide improved means for enabling the operator to determine quickly and easily the range of an object represented by an indication on the screen of the cathode ray tube.

According to the invention there is provided electronic range finding apparatus comprising a cathode ray tube, means for causing the beam to execute an angularly moving radial trace, and means for causing the beam to produce on the screen of the cathode ray tube a radially arranged range scale and means for adjusting the angular position of said scale.

Said range scale may comprise a plurality of arcuate lines some of which may be longer than the others whereby a range scale with units and sub-units is provided; for example every fifth division of the scale may be represented by a longer line than the other divisions.

In order that the said invetion may be clearly understood and readily carried into effect, the same will now be more fully described with reference to the accompanying drawing, in which.

Figure 1:
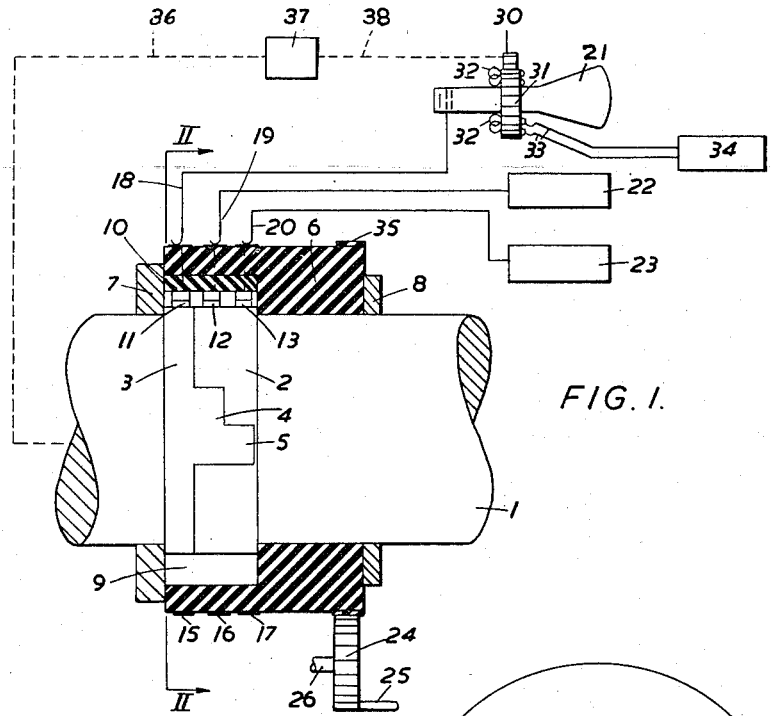
Figure 1 is a sectional view of part of apparatus embodying the invention.
Figure 2:
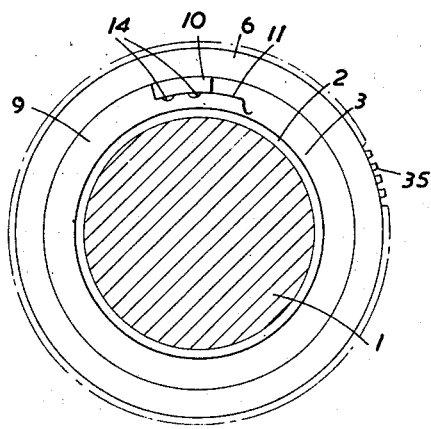
Figure 2 is a sectional view on the line II—II of Figure 1.
Figure 3:
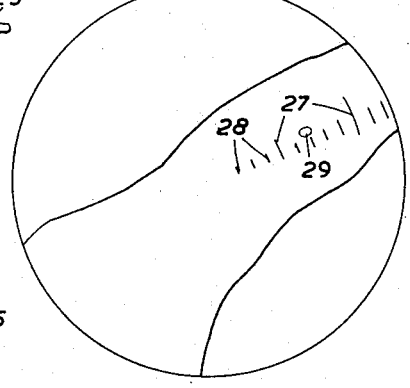

Figure 3 represents a P. P. I. screen with a range scale appearing thereon. it being assumed for the purpose of description that the radial trace rotates about the centre of the screen in synchronism with a rotating aerial system, although the invention is applicable also to apparatus wherein the trace executes to and fro angular movements in synchronism with a swinging aerial system.

Referring to the drawing, reference numeral 1 designates a shaft arranged to rotate in synchronism with the rotating aerial system. The shaft 1 is coupled, by gearing indicated by broken line 36, with the aerial driving motor 37 which is coupled by gearing indicated by the broken line 38, with a gear wheel 30. Gear wheel 30 meshes with a toothed collar 31 which is mounted for rotation about the neck of cathode tube 21, and which carries deflecting coils 32 connected by slip-rings to contact fingers 33 connected to a deflection current generator 34. By reason of the above mentioned couplings, shaft 1 and collar 31 rotate in synchronism with the aerial. The deflection currents from generator 34 cause radial deflections of the beam whereby a radial trace is produced, said trace moving angularly with respect to the tube screen as collar 31 rotates. If fixed coils are employed the currents in which are controlled by a goniometer or the like for the purpose of rotating the radial trace, shaft 1 may be coupled to a rotating part of said goniometer or the like. On shaft 1, and secured to it in any suitable manner is a ring 2 of insulating material, on the circumference of which is provided an electrically conducting contact member which comprises a contact 3 which extends continuously around the circumference of ring 2, a relatively short arcuate contact 4, and an arcuate contact 5, which is shorter than contact 4. An insulating collar 6 is rotatably mounted on shaft 1, axial movement of collar 6 relative to shaft 1 being prevented by collars 7 and 8 secured in any suitable manner on shaft 1. Collar 6 is provided with an annular recess 9, and within recess 9 is provided an insulating contact block 10 having three spring contact fingers 11, 12 and 13 secured to it by screws 14 which may also serve to secure block 10 to collar 6. On the outer surface of collar 6 are provided slip-rings 15, 16 and 17 which are electrically connected respectively to the contact fingers 11, 12 and 13. The contact fingers 11, 12 and 13 are so arranged that during relative rotation of shaft 1 and collar 6, they make contact respectively with the contacts 3, 4 and 5, finger 11 being continuously in contact with contact 3. Spring contact fingers 18, 19 and 20 make continuous contact respectively with slip-rings 15, 16 and 17, finger 18 being electrically connected to the control electrode of the cathode ray tube 21, finger 19 being electrically connected to a pulse generator indicated diagrammatically at 22, and finger 20 being electrically connected to a further pulse generator indicated diagrammatically at 23.

Collar 6 is normally stationary, that is to say it does not rotate with shaft 1, but is capable of being angularly adjusted. For this purpose gear teeth may be formed on the periphery of collar 6, said teeth engaging with a gear wheel 24 provided with an adjusting handle 25, wheel 24 being rotatable on a shaft 26, with sufficient friction to prevent rotation of collar 6 under the action of the rotation of shaft 1.

The operation is as follows:

During each rotation of shaft 1, contact finger 12 contacts the contact 4 for a time, during which the pulse generator 22 is connected to the control electrode of the cathode ray tube via contact finger 19, slip-ring 16, contact finger 12, contact 4, contact 3, contact finger 11, slip-ring 15 and contact finger 18. Pulses are thereby applied to said control electrode in such sense and at such frequency that during a radial deflection of the beam the latter is modulated so as to produce a number of radially spaced bright dots forming a range scale. Preferably the contact 4 is of such length that it is in contact with contact finger 12 for a time corresponding to a plurality of consecutive radial deflections of the beam, so that by reason of the angular movement of the trace and the phosphorescence (persistence) of the screen material the effect of the modulations during each of said deflections is to form on the tube screen (see Figure 3) a plurality of short arcuate lines 27 during each rotation of the trace, said lines extending over an arc of about 5°. In a similar manner, there are also produced a plurality of arcuate lines 28 by the connection of pulse generator 23 to the control electrode of the cathode ray tube due to the contact finger 13 contacting the contact 5 during each rotation of shaft 1. Since contact 5 is shorter than contact 4, pulse generator 23 will be connected to said control electrode during fewer radial deflections of the beam than pulse generator 22 so that the arcuate lines 28 are shorter than the lines 27. The frequency of the pulses generated by the generator 23 is a multiple of the frequency of the pulses generated by generator 22, so that the lines 27 and 28 form a range scale in which lines 27 represent units, for example 5,000 yards, and lines 28 represent sub-units, for example 1,000 yards. Rotation of collar 6 around shaft 1 alters the time, during the rotation of shaft 1, at which contact fingers 12 and 13 contact the contacts 4 and 5, and thus alters the time, during rotation of the radial trace, during which the beam is modulated by the pulses. Thus rotation of collar 6 causes the range scale to move around the screen. By rotating handle 25, therefore, the operator can quickly move the range scale so as to bring it adjacent a part of the presentation the range of which it is desired to measure. Referring to Figure 3, and assuming that the apparatus described forms part of a plan position indicator, the presentation represents for example an estuary, and an object which may for example be a ship. By bringing the range scale adjacent the spot 29 representing said object, the operator can quickly determine its range, which in the example is about 7,000 yards.

If desired, one or more additional contacts may be provided on shaft 1 so as to provide the range scale with longer markings representing for example ten, twenty or more times the ranges represented by the markings 28.

Means are preferably provided for synchronising the above-mentioned pulse generators under the control of the means for producing the radial deflections of the beam, so that the modulations occur at the same times after the commencement of each radial trace.

Instead of employing an arrangement such as the contacts 3, 4 and 5 and their associated contact fingers for timing the pulses, said timing may if preferred be effected by suitably controlling the pulse generators 22 and 23 so as to render them operative and inoperative at suitable times.

It will be seen that if even the range scale comprises a large number of lines a much smaller area of the screen is obscured compared with the prior proposals in which calibration rings are employed. Moreover, any distortion of the radial deflections is also imparted to the range scale so that such distortion is automatically taken into account when a range measurement is made.

The invention has been described in its application to apparatus of the kind generally referred to as a plan position indicator, but as will be appreciated the invention relates generally to radar apparatus wherein the beam of a cathode ray tube is arranged to execute a radial trace which is moved angularly on the tube screen.

I claim:

1. Electronic range finding apparatus comprising a cathode ray tube having a screen, means for deflecting the beam in said tube to produce a radial trace on said screen, means for deflecting the beam to move said trace angularly, means for modulating said beam periodically for a period less than the period of angular movement of said beam to produce on said screen a normally stationary radially extending series of separated marks forming a range scale of smaller angular extent than the angle swept by said beam, and means for adjusting the angular position of said scale relative to said screen.

2. Electronic range finding apparatus comprising a cathode ray tube having a screen, means for deflecting the beam of said tube to produce a radial trace on said screen, means for deflecting the beam to move said trace angularly, means for modulating said beam periodically for a period less than the period of angular movement of said beam to provide on said screen a normally stationary radially extending series of separated marks forming a range scale of smaller angular extent than the angle swept by said beam, and means for adjusting the timing of said modulations to cause said range scale to move angularly with respect to said screen.

3. Electronic range finding apparatus comprising a cathode ray tube having a screen, means for deflecting the beam in said tube to produce an angularly moving radial trace on said screen, means for producing first modulations of said beam periodically to provide on said screen a normally stationary radially extending series of separated marks of smaller angular extent than the angle swept by said beam to represent range units, means for producing second modulations of said beam to provide on said screen a second normally stationary radially extending series of separated marks of different angular extent from said first marks and of smaller angular extent than the angle swept by said beam to represent subdivisions of said range units, and means for adjusting the timing of said modulations to move said range scale angularly with respect to said screen.

4. Electronic range finding apparatus according to claim 1, wherein the means for modulating said beam to produce said range scale includes a pulse generator, and means for intermittently connecting said generator to said cathode ray tube during each radial movement of said beam to apply beam-modulating pulses to said tube.

5. Electronic range finding apparatus according to claim 3, wherein the means for modulating said beam includes first and second pulse generators, means for intermittently connecting one of said generators to the cathode ray tube during each radial movement of said beam, and means for intermittently connecting the other of said generators to the tube during different time intervals.

6. Electronic range finding apparatus comprising a cathode ray tube having a screen, means for deflecting the beam in said tube to produce a radial trace on said screen, means for deflecting the beam to move said trace angularly, two fixed contacts connected respectively to said tube and to a source of beam-modulating pulses, an angularly movable contact for intermittently connecting said fixed contacts to produce a radial range scale in said screen, and means for angularly adjusting the fixed contacts to change the position of said scale on the screen.

7. Electronic range finding apparatus comprising a cathode ray tube having a screen, means for deflecting the beam in said tube to produce a radial trace on said screen, means for rotating said beam with respect to said screen, a rotary contact supporting member, means for rotating said support in synchronism with said beam, a first contact carried by and rotatable with said rotary member, a normally fixed insulating contact support, a second contact carried by said support in continuous contact with said first contact, a third contact carried by said support for intermittent contact with said first contact during rotation of said rotary member, a pulse generator, one of said second and third contacts being connected to said cathode ray tube and the other being connected to said generator to apply beam-modulating pulses to the tube for producing a range scale on the tube screen, and means for adjusting said contact support and its contacts angularly with respect to said rotary member to adjust the angular position of the range scale with respect to said screen.

GEOFFREY WALTER HART.

REFERENCES CITED

The following references are of record in the file of this patent:

UNITED STATES PATENTS

| Number | Name | Date |
| --- | --- | --- |
| 2,178,074 | Jakel et al. | Oct. 31, 1939 |
| 2,307,237 | Rea et al. | Jan. 5, 1943 |
| 2,408,414 | Donaldson | Oct. 1, 1946 |
| 2,408,415 | Donaldson | Oct. 1, 1946 |
| 2,422,697 | Meacham | June 24, 1947 |
| 2,436,827 | Richardson | Mar. 2, 1948 |
| 2,468,032 | Busignies | Apr. 26, 1949 |
| 2,481,354 | Schuler | Sept. 6, 1949 |